(12) United States Patent
Tsurumi

(10) Patent No.: US 10,962,058 B2
(45) Date of Patent: Mar. 30, 2021

(54) ROTATOR SUPPORT SHAFT, METHOD FOR MANUFACTURING ROTATOR SUPPORT SHAFT, AND ROLLER BEARING

(71) Applicant: JTEKT CORPORATION, Osaka (JP)

(72) Inventor: Koichiro Tsurumi, Utsunomiya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/503,708

(22) Filed: Jul. 5, 2019

(65) Prior Publication Data

US 2020/0018352 A1 Jan. 16, 2020

(30) Foreign Application Priority Data

Jul. 10, 2018 (JP) .............................. JP2018-130947

(51) Int. Cl.
*F16C 33/66* (2006.01)
*F16H 57/08* (2006.01)
(Continued)

(52) U.S. Cl.
CPC .......... *F16C 33/6659* (2013.01); *F16C 33/76* (2013.01); *F16C 43/045* (2013.01); *F16H 57/043* (2013.01); *F16H 57/0479* (2013.01); *F16H 57/08* (2013.01); *F16H 2057/085* (2013.01)

(58) Field of Classification Search
CPC .............. F16C 33/6659; F16C 33/6677; F16C 43/045; F16H 57/08; F16H 57/043; F16H 57/0479; F16H 2057/085; F16H 57/0471; F16H 57/0482
See application file for complete search history.

(56) References Cited

U.S. PATENT DOCUMENTS 4,006,943 A * 2/1977 Gibble ..................... B21K 1/10
384/381
8,425,361 B1 * 4/2013 Beckner .............. F16H 57/0479
475/159
(Continued)

FOREIGN PATENT DOCUMENTS

JP 2007-198459 A 8/2007
JP 2008014483 A * 1/2008 .......... F16C 33/6677
JP 2010169142 A * 8/2010 .............. F16C 33/46

OTHER PUBLICATIONS

Machine Translation of JP-2010169142-A (Year: 2010).*
Machine Translation of JP-2008014483-A (Year: 2008).*

*Primary Examiner* — Alan B Waits
(74) *Attorney, Agent, or Firm* — Oliff PLC

(57) ABSTRACT

A columnar rotator support shaft supports a planet gear that is a rotator, and has a raceway surface formed on the outer peripheral surface of the rotator support shaft so that a plurality of rollers roll on the raceway surface. The rotator support shaft includes a hollow portion formed so as to be recessed in an axial direction from both axial end faces, a plug serving as a sealing member that seals at least one of openings of the hollow portion at both the end faces, an oil inlet passage through which lubricating oil is supplied into the hollow portion sealed with the plug, and an oil outlet passage through which the lubricating oil in the hollow portion is supplied to the raceway surface. The oil outlet passage passes through the rotator support shaft from the raceway surface to the sealed hollow portion.

4 Claims, 5 Drawing Sheets

(51) Int. Cl.
    *F16H 57/04*     (2010.01)
    *F16C 33/76*     (2006.01)
    *F16C 43/04*     (2006.01)

(56) References Cited

U.S. PATENT DOCUMENTS

| | | | | |
|---|---|---|---|---|
| 2006/0148611 A1* | 7/2006 | Neudecker | ......... | F16H 57/0479 |
| | | | | 475/331 |
| 2006/0252596 A1* | 11/2006 | Abarquez | ............ | F16H 57/082 |
| | | | | 475/331 |
| 2009/0247348 A1* | 10/2009 | Haupt | ................ | F16H 57/0479 |
| | | | | 475/159 |
| 2018/0363694 A1* | 12/2018 | Ohno | ....................... | F16C 3/02 |

\* cited by examiner

ROTATOR SUPPORT SHAFT, METHOD FOR MANUFACTURING ROTATOR SUPPORT SHAFT, AND ROLLER BEARING

INCORPORATION BY REFERENCE

The disclosure of Japanese Patent Application No. 2018-130947 filed on Jul. 10, 2018 including the specification, drawings and abstract, is incorporated herein by reference in its entirety.

BACKGROUND OF THE INVENTION

1. Field of the Invention

The present invention relates to a rotator support shaft that supports a rotator via rollers, a method for manufacturing the rotator support shaft, and a roller bearing.

2. Description of the Related Art

There is known a rotator support shaft that supports a rotator such as a gear or a roller via rollers. For example, a rotator support shaft that supports a planet gear via rollers is used in a planetary gearing mechanism.

There is a rotator support shaft having a hollow portion extending along an axial direction. The hollow portion is formed in order to reduce weight of the rotator support shaft, and is used also as a part of a lubricating oil supply passage to the rollers (see, for example, Japanese Patent Application Publication No. 2007-198459 (JP 2007-198459 A)).

The hollow portion of the rotator support shaft is formed by machining that uses a drill or the like or by forging. It is desirable that the hollow portion be formed by forging from the viewpoint of manufacturing costs or the like. When the hollow portion is formed by forging, however, work hardening may develop during forming of the hollow portion, and the forming may no longer be performed. This issue is likely to occur particularly when the hollow portion is deep with a small diameter. When work hardening occurs, forming can be performed again by performing annealing for softening. However, it takes a great deal of time and effort for manufacture, and the manufacturing costs increase as well.

SUMMARY OF THE INVENTION

It is one object of the present invention to provide a rotator support shaft that can easily be manufactured by forging, a method for manufacturing the rotator support shaft, and a roller bearing.

A columnar rotator support shaft according to one aspect of the present invention, which is configured to support a rotator and has a raceway surface formed on an outer peripheral surface of the rotator support shaft so that a plurality of rollers roll on the raceway surface, has the following features in its structure. That is, the rotator support shaft includes a hollow portion, a sealing member, an oil inlet passage, and an oil outlet passage. The hollow portion is formed so as to be recessed in an axial direction from both axial end faces. The sealing member seals at least one of openings of the hollow portion at both the end faces. Lubricating oil is supplied through the oil inlet passage into the hollow portion sealed with the sealing member. The lubricating oil in the hollow portion is supplied to the raceway surface through the oil outlet passage. The oil outlet passage passes through the rotator support shaft from the raceway surface to the sealed hollow portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention is described with reference to FIG. 1 to FIG. 5. The following embodiment is described as a preferred specific example for carrying out the present invention. Although various preferred technical matters are partially exemplified in detail, the technical scope of the present invention is not limited to the specific modes.

Figure 1:
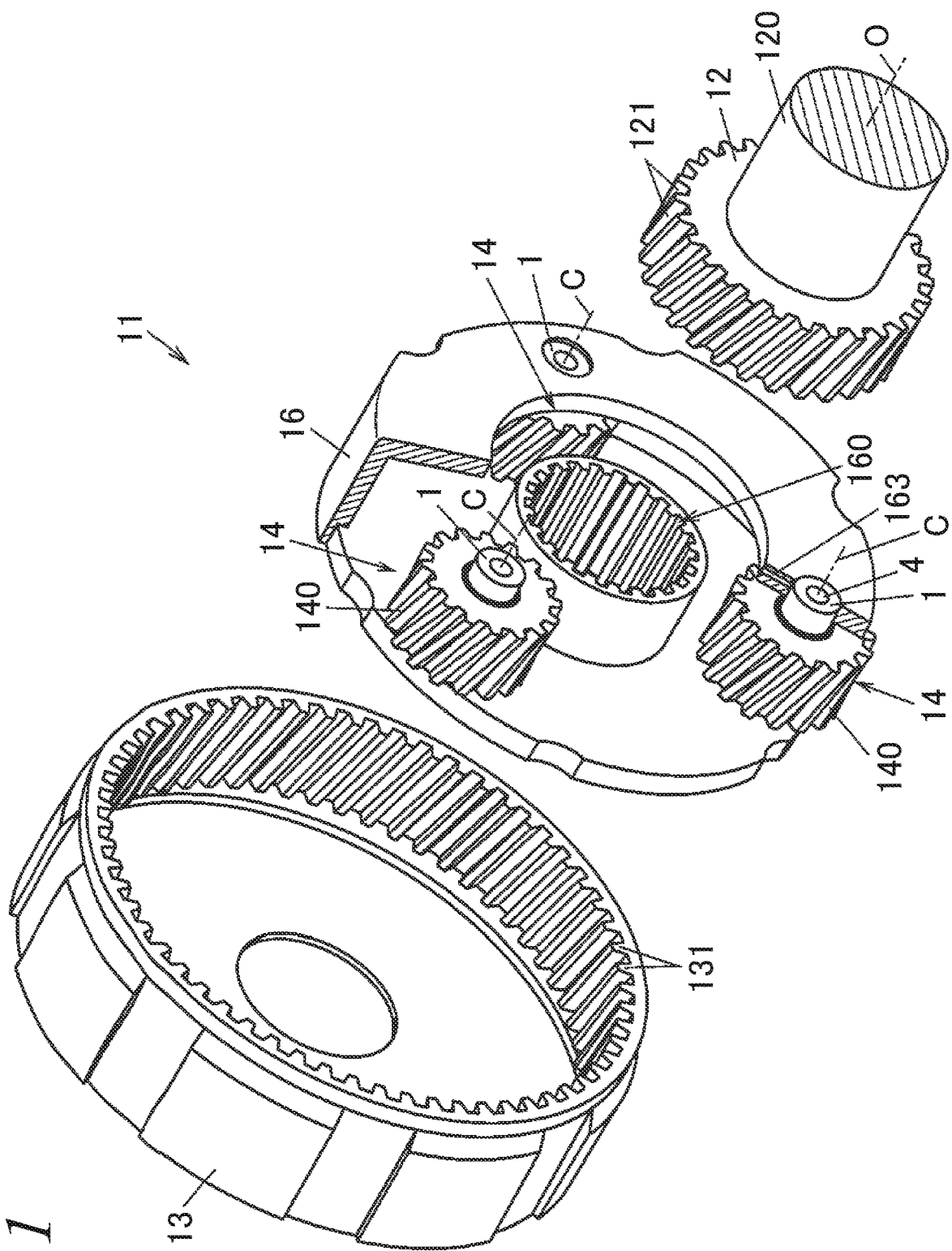
FIG. 1 is an exploded perspective view illustrating a planetary gearing mechanism to which a rotator support shaft according to one embodiment of the present invention is applied.
Figure 2:
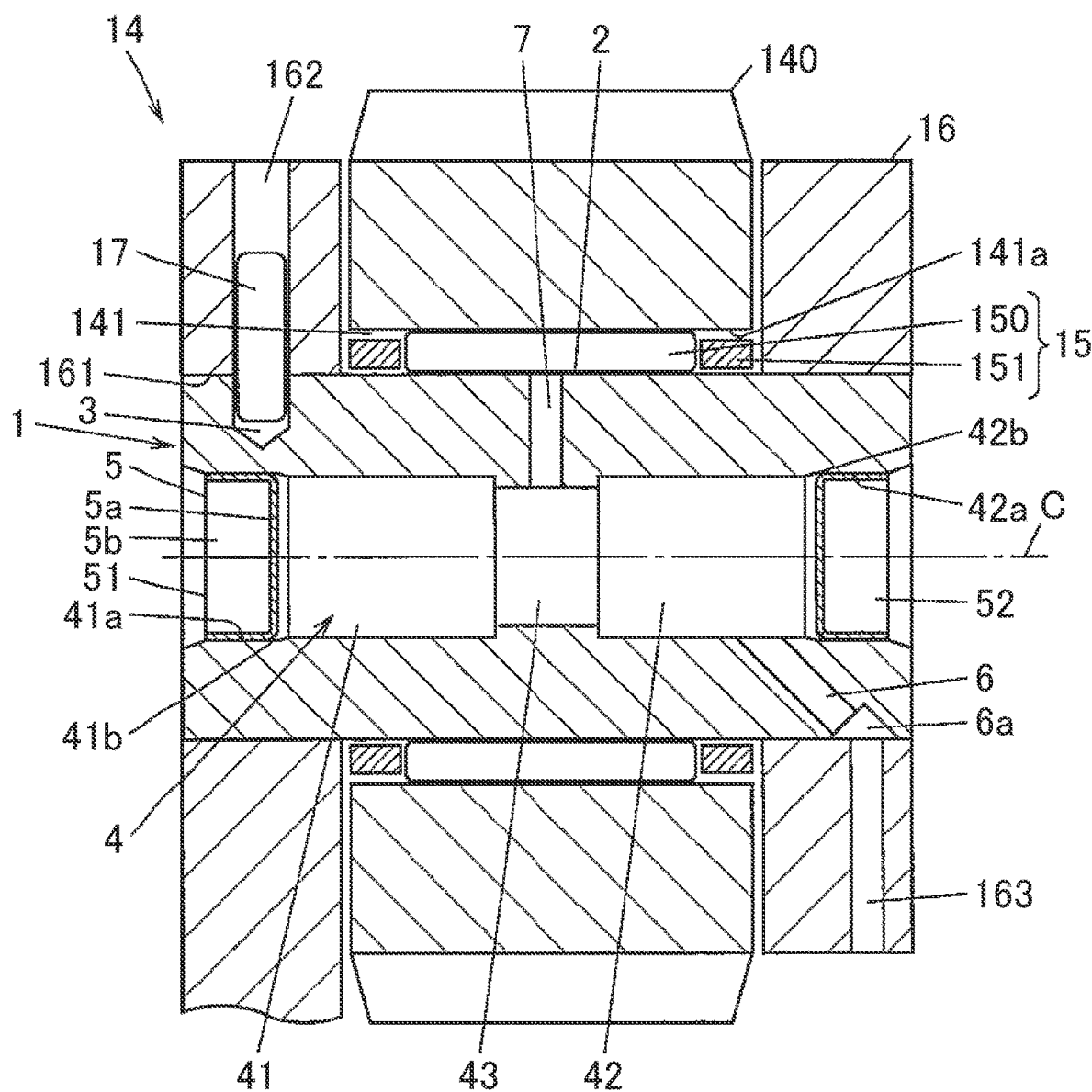
FIG. 2 is a sectional view of a planet gear using the rotator support shaft according to the embodiment of the present invention.

FIG. 1 is an exploded perspective view illustrating a planetary gearing mechanism to which a rotator support shaft according to this embodiment is applied. FIG. 2 is a sectional view of a planet gear unit using the rotator support shaft according to this embodiment.

A planetary gearing mechanism 11 includes a sun gear 12, an annulus gear 13, a plurality of (three in this embodiment) planet gear units 14, and a carrier 16. The sun gear 12 has external teeth 121 on its outer peripheral surface. The annulus gear 13 has internal teeth 131 on its inner peripheral surface. The planet gear units 14 are arranged between the sun gear 12 and the annulus gear 13 to mesh with the external teeth 121 and the internal teeth 131. Each planet gear unit 14 is fixed to the carrier 16 so as to be rotatable (about its axis).

For example, the planetary gearing mechanism 11 is used in a transmission configured to change the speed of rotation of an output shaft (crankshaft) of an engine serving as a drive source of an automobile. In the planetary gearing mechanism 11, one element out of the three elements that are the sun gear 12, the annulus gear 13, and the carrier 16 is fixed, and a torque is input to another element. Thus, the input torque is transmitted to the one remaining element while the speed is reduced or increased. Sliding of each part of the planetary gearing mechanism 11 is lubricated by lubricating oil (transmission oil).

A shaft 120 is fixed to the center of the sun gear 12 so as not to be rotatable relative to the sun gear 12. The shaft 120 is arranged concentrically with the annulus gear 13 and the carrier 16. Each planet gear unit 14 includes a planet gear 140 and a roller bearing 15. The planet gear 140 meshes with the external teeth 121 and the internal teeth 131. The roller bearing 15 has a rotator support shaft 1 of the present invention to support the planet gear 140 that is a rotator. The rotator support shaft 1 is inserted through a shaft hole 141 passing through the center of the planet gear 140.

The rotator support shaft 1 is formed into a substantially columnar shape. The outer peripheral surface of the rotator support shaft 1 is a raceway surface 2 where rollers 150 roll. The rotator support shaft 1 supports the planet gear 140 that is the rotator via the rollers 150. Both axial ends of the rotator support shaft 1 are fixed to a shaft fixing hole 161 formed in the carrier 16.

In this embodiment, the carrier 16 has a pin insertion hole 162 that communicates with the shaft fixing hole 161 and is open radially outward. The rotator support shaft 1 has a pin hole 3 at a position where the pin hole 3 faces the pin insertion hole 162. The rotator support shaft 1 is fixed to the carrier 16 by inserting a pin 17 into the pin insertion hole 162 and the pin hole 3. In this embodiment, description is given of the case where the rotator support shaft 1 is fixed to the carrier 16 by using the pin 17. The present invention is not limited to this case. The rotator support shaft 1 may be fixed to the carrier 16 by staking the end of the rotator support shaft 1 (expanding the end through deformation).

The roller bearing 15 smooths rotation of the planet gear 140 around the rotator support shaft 1 by the plurality of rollers 150 that roll along the outer peripheral surface (raceway surface 2) of the rotator support shaft 1 and an inner peripheral surface 141a of the shaft hole 141 of the planet gear 140. The roller bearing 15 supports rotation of the planet gear 140 about its axis while receiving a centrifugal force generated by rotation of the planet gear unit 14 about the shaft 120. The roller bearing 15 is also called needle roller radial bearing. The roller bearing 15 includes the rotator support shaft 1, the columnar rollers 150, and a ring-shaped cage 151 that retains the rollers 150. Each roller 150 is arranged so that its axial direction coincides with an axial direction of the cage 151. The rollers 150 are arranged at regular intervals in a circumferential direction of the cage 151.

For example, when the annulus gear 13 is fixed and the shaft 120 rotates, the speed of rotation of the sun gear 12 that rotates together with the shaft 120 is reduced, and the rotation is output to an output shaft (not illustrated) spline-fitted to a central hole 160 of the carrier 16. At this time, the planet gear 140 rotates about a rotation axis O of the shaft 120, and also rotates about a central axis C of the rotator support shaft 1.

For example, steel may be used for the rotator support shaft 1. SUJ2 (high-carbon chromium bearing steel) or S45C (carbon steel for machine structural use) may be used preferably. In this embodiment, the rotator support shaft 1 is formed by using SUJ2 having a relatively low formability. For example, the outside diameter of the rotator support shaft 1 is about 30 mm. For example, the length of the rotator support shaft 1 is about 50 mm. A direction parallel to the central axis C of the rotator support shaft 1 is hereinafter referred to as an axial direction.

The overall rotator support shaft 1 is formed into a substantially columnar shape. At the center of a cross section perpendicular to the axial direction (axial center), a hollow portion 4 is formed so as to be recessed in the axial direction from both axial end faces. That is, the hollow portion 4 is formed so as to extend in the axial direction and to be open to both the axial end faces. In this embodiment, the hollow portion 4 is formed so as to pass through the rotator support shaft 1 in the axial direction.

The hollow portion 4 has a first hollow portion 41, a second hollow portion 42, and a communicating portion 43. The first hollow portion 41 is open to one side in the axial direction (left side in FIG. 2). The second hollow portion 42 is open to the other side in the axial direction (right side in FIG. 2). The communicating portion 43 communicates the first hollow portion 41 with the second hollow portion 42. That is, the hollow portion 4 has the first hollow portion 41, the communicating portion 43, and the second hollow portion 42 in this order from the one side to the other side in the axial direction. The diameters of the first hollow portion 41 and the second hollow portion 42 are substantially equal. The diameter of the communicating portion 43 is smaller than the diameters of the first hollow portion 41 and the second hollow portion 42. The diameters and depths (lengths along the axial direction from the ends) of the first hollow portion 41 and the second hollow portion 42 may be set as appropriate depending on, for example, required oil fluidity of the lubricating oil and workability of the rotator support shaft 1.

In this embodiment, both openings of the hollow portion 4 at both the end faces of the rotator support shaft 1 are sealed with plugs 5 serving as sealing members. The hollow portion 4 is used as a part of a lubricating oil supply passage to the rollers 150. Leakage of the lubricating oil from the openings can be suppressed by sealing the openings of the hollow portion 4 with the plugs 5. In this embodiment, two plugs 5 that are a first plug 51 and a second plug 52 are provided. The first plug 51 seals the opening of the first hollow portion 41. The second plug 52 seals the opening of the second hollow portion 42. Other than the plug 5, a bolt-shaped member having grooves on its outer peripheral surface may be used as the sealing member that seals the opening of the hollow portion 4.

The first and second plugs 51 and 52 are formed into the same shape, and each integrally have a bottom wall 5a and a tubular portion 5b having a shape of a short cylinder. The tubular portion 5b protrudes in the axial direction from the radially outer edge of the bottom wall 5a. The first and second plugs 51 and 52 are fixed by being press-fitted into the first and second hollow portions 41 and 42 from the bottom wall 5a side, respectively. Large-diameter portions 41a and 42a whose diameters increase stepwise are formed at an opening-side end of the first hollow portion 41 and at an opening-side end of the second hollow portion 42, respectively. Steps 41b and 42b are formed at boundaries between the large-diameter portion 41a and the other part of the first hollow portion 41 and between the large-diameter portion 42a and the other part of the second hollow portion 42, respectively. The first and second plugs 51 and 52 interfere with the steps 41b and 42b, respectively, thereby preventing the first and second plugs 51 and 52 from being excessively pushed into the first and second hollow portions 41 and 42, respectively, when the first and second plugs 51 and 52 are press-fitted. The opening-side ends of the large-diameter portions 41a and 42a are tapered so that the diameters increase toward the openings. Thus, the first and second plugs 51 and 52 are easily inserted into the large-diameter portions 41a and 42a, respectively.

Cold rolled carbon steel sheets such as SPCC may be used for the first and second plugs 51 and 52. Depending on compatibility with the lubricating oil in use or use temperatures, the first and second plugs 51 and 52 may be formed of a resin or of a resin containing a metal core. The outside diameters, heights, and thicknesses of the first and second plugs 51 and 52 may be set as appropriate depending on the shapes of the end holes. The dimensions of the first plug 51 and the second plug 52 may differ from each other.

The rotator support shaft 1 further has an oil inlet passage 6 and an oil outlet passage 7. The lubricating oil is supplied through the oil inlet passage 6 into the hollow portion 4 sealed with the first and second plugs 51 and 52 (demarcated from an external space). The oil outlet passage 7 passes through the rotator support shaft 1 from the raceway surface 2 to the sealed hollow portion 4. The lubricating oil in the hollow portion 4 is supplied to the raceway surface 2 through the oil outlet passage 7.

One end of the oil inlet passage 6 communicates with an oil passage 163 formed in the carrier 16 for lubricating oil supply, and the other end of the oil inlet passage 6 communicates with the second hollow portion 42 sealed with the second plug 52. In this embodiment, the oil inlet passage 6 is formed so as to extend in a direction in which the oil inlet passage 6 is inclined with respect to the axial direction and the radial direction (toward an inner side in the radial direction and the communicating portion 43 side in the axial direction) in order to bypass the second plug 52. A large-diameter portion 6a whose diameter is larger than the diameter of the oil passage 163 is formed at the end of the oil inlet passage 6 on the oil passage 163 side. Thus, even if the carrier 16 and the rotator support shaft 1 are misaligned during assembling or the like, the outlet of the oil passage 163 faces the oil inlet passage 6, thereby suppressing leakage of the lubricating oil. The position, inclination angle, and bore diameter of the oil inlet passage 6 are not particularly limited and may be set as appropriate. For example, if there is no need to bypass the second plug 52 because the second plug 52 is provided on an outer side of the outlet of the oil passage 163 in the axial direction, the oil inlet passage 6 may be formed so as to extend along the radial direction.

The oil outlet passage 7 is formed at the center of the rotator support shaft 1 in the axial direction so as to extend along the radial direction. In this embodiment, the oil outlet passage 7 is formed so that one end communicates with the communicating portion 43 and the other end is open to the raceway surface 2. The oil outlet passage 7 is not limited to this structure, and one end of the oil outlet passage 7 may communicate with the first hollow portion 41 or the second hollow portion 42. The oil outlet passage 7 may extend in a direction in which the oil outlet passage 7 is slightly inclined with respect to the radial direction. The arrangement of the opening of the oil outlet passage 7 on the roller 150 side may be set as appropriate depending on, for example, the positional relationship with the rollers 150 and the oil fluidity.

The lubricating oil is supplied from the oil passage 163 to the rotator support shaft 1 by a centrifugal force generated when the carrier 16 rotates, and is introduced into the hollow portion 4 through the oil inlet passage 6. The lubricating oil introduced into the hollow portion 4 is supplied to the raceway surface 2 through the oil outlet passage 7 by the centrifugal force generated when the carrier 16 rotates, thereby lubricating the rollers 150.

Figure 3:
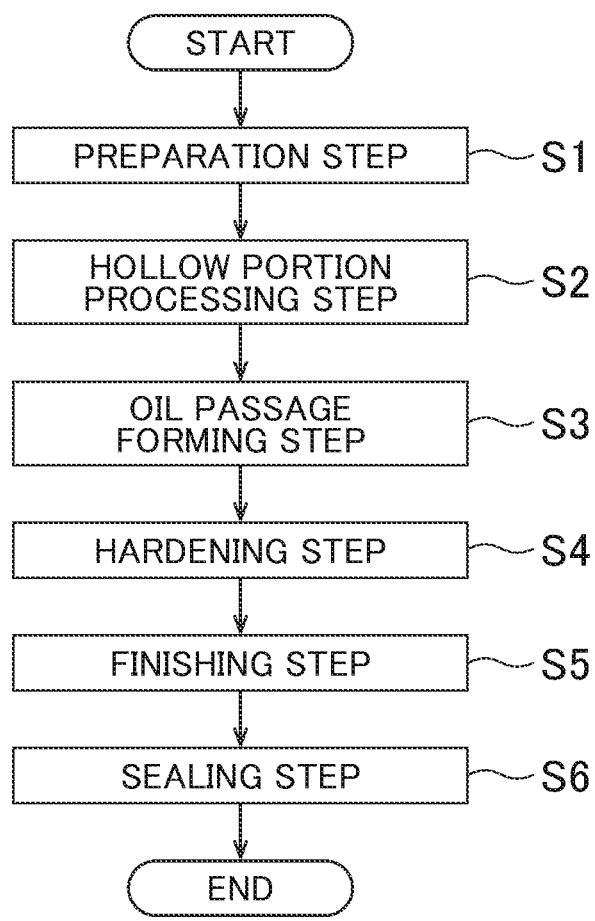
FIG. 3 is a flowchart illustrating procedures of a method for manufacturing the rotator support shaft according to the embodiment of the present invention.

FIG. 3 is a flowchart illustrating procedures of a method for manufacturing the rotator support shaft according to this embodiment. As illustrated in FIG. 3, in the method for manufacturing the rotator support shaft according to this embodiment, a preparation step for preparing a base metal for the rotator support shaft 1 is first performed as Step S1. If the rotator support shaft 1 is formed of a material such as SUJ2 having a relatively low formability, it is appropriate to prepare a cylindrical base metal whose dimensions are relatively close to product dimensions (whose outside diameter is slightly larger than that of the product dimensions).

Then, a hollow portion processing step for forming the hollow portion 4 by forging is performed as Step S2. In this embodiment, the hollow portion processing step involves backward extrusion for both axial ends of the base metal. Thus, the hollow portion 4 is formed so as to be recessed in the axial direction from both axial end faces.

Figure 4A:
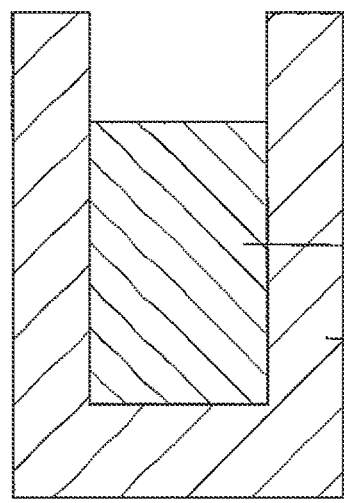
FIGS. 4A, 4B, 4C, and 4D are explanatory drawings for describing a hollow portion processing step.
Figure 4B:
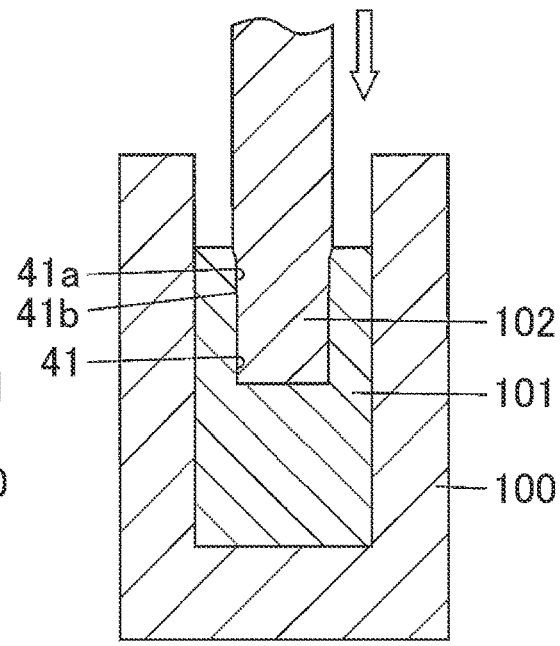
Figure 4C:
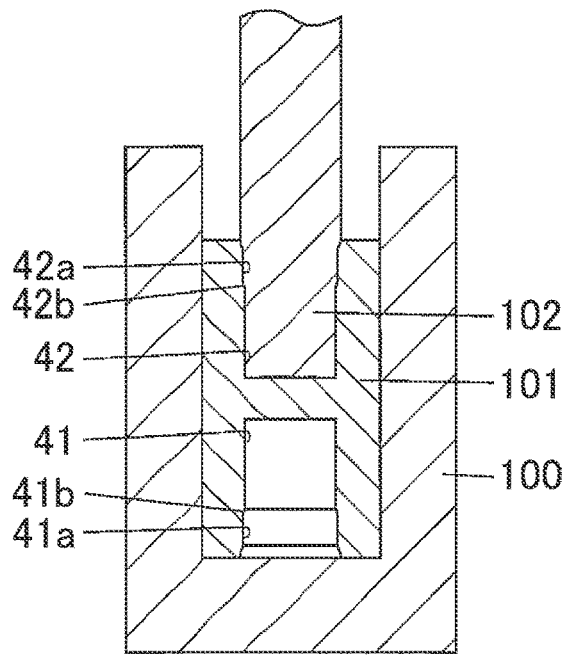

Specifically, as illustrated in FIG. 4A, a base metal 101 is first set in a bottomed cylindrical lower die 100. As illustrated in FIG. 4B, backward extrusion is performed by pushing a punch 102 to the center of one end of the base metal 101, thereby forming the first hollow portion 41. As illustrated in FIG. 4C, the base metal 101 is then set in the lower die 100 while the end of the base metal 101 where the first hollow portion 41 is not formed is located on an opening side. Backward extrusion is performed by pushing the punch 102 to the center of the other end of the base metal 101, thereby forming the second hollow portion 42. Description is herein given of the case where the backward extrusion is performed for one end of the base metal 101 and then for the other end of the base metal 101. The present invention is not limited to this case. The backward extrusion may be performed simultaneously for both the ends of the base metal 101. Further, the second hollow portion 42 may be formed while a spacer is inserted in the first hollow portion 41 so that the first hollow portion 41 is not deformed when the second hollow portion 42 is formed.

Figure 4D:
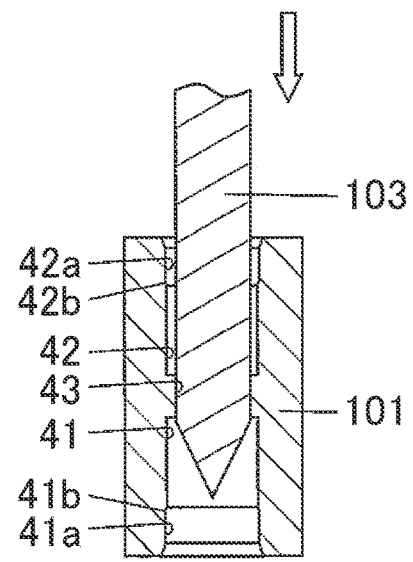

As illustrated in FIG. 4D, the communicating portion 43 is then formed by passing through a wall between the first hollow portion 41 and the second hollow portion 42 by machining (drilling) that uses a drill 103. Thus, the first hollow portion 41 and the second hollow portion 42 communicate with each other via the communicating portion 43, thereby forming the hollow portion 4. The communicating portion 43 need not essentially be formed by machining that uses the drill 103, and may be formed by, for example, punching. Further, the communicating portion 43 may be processed in an oil passage forming step of Step S3 described later. Through this step, a workpiece subjected to the hollow portion processing step is obtained.

After the hollow portion processing step of Step S2 is performed, the oil passage forming step is performed as Step S3 for the workpiece subjected to the hollow portion processing step. In the oil passage forming step, the oil inlet passage 6, the oil outlet passage 7, and the pin hole 3 are formed by machining (drilling) that uses a drill. Through this step, a workpiece subjected to the oil passage forming step is obtained.

Then, a hardening step is performed as Step S4 for the workpiece subjected to the oil passage forming step. In the hardening step, quenching and tempering are performed for the workpiece subjected to the oil passage forming step. Alternatively, carburizing is performed, followed by quenching and tempering from a carburizing temperature. In the hardening step, carbonitriding may be performed, followed by quenching and tempering from a carbonitriding temperature. In addition, annealing or induction heating may be performed in combination. The workpiece is hardened so that at least the surface where the rollers 150 roll has a hardness ranging from 58 HRc to 64 HRc. Through this step, a workpiece subjected to the hardening step is obtained.

Then, a finishing step is performed as Step S5 for the workpiece subjected to the hardening step. In the finishing step, the workpiece subjected to the hardening step is cut or ground at necessary portions in order to achieve dimensions, a shape, and a surface roughness described in a drawing. Through this step, a workpiece subjected to the finishing step is obtained.

Then, a sealing step is performed as Step S6 for the workpiece subjected to the finishing step. In the sealing step, both openings of the hollow portion 4 at both the end faces of the workpiece subjected to the finishing step are sealed with the plugs 5 serving as the sealing members. In the sealing step, both the openings of the hollow portion 4 are sealed with the plugs 5 by press-fitting the first plug 51 from the opening of the first hollow portion 41 and press-fitting the second plug 52 from the opening of the second hollow portion 42. Through the steps described above, the rotator support shaft 1 is obtained.

Figure 5:
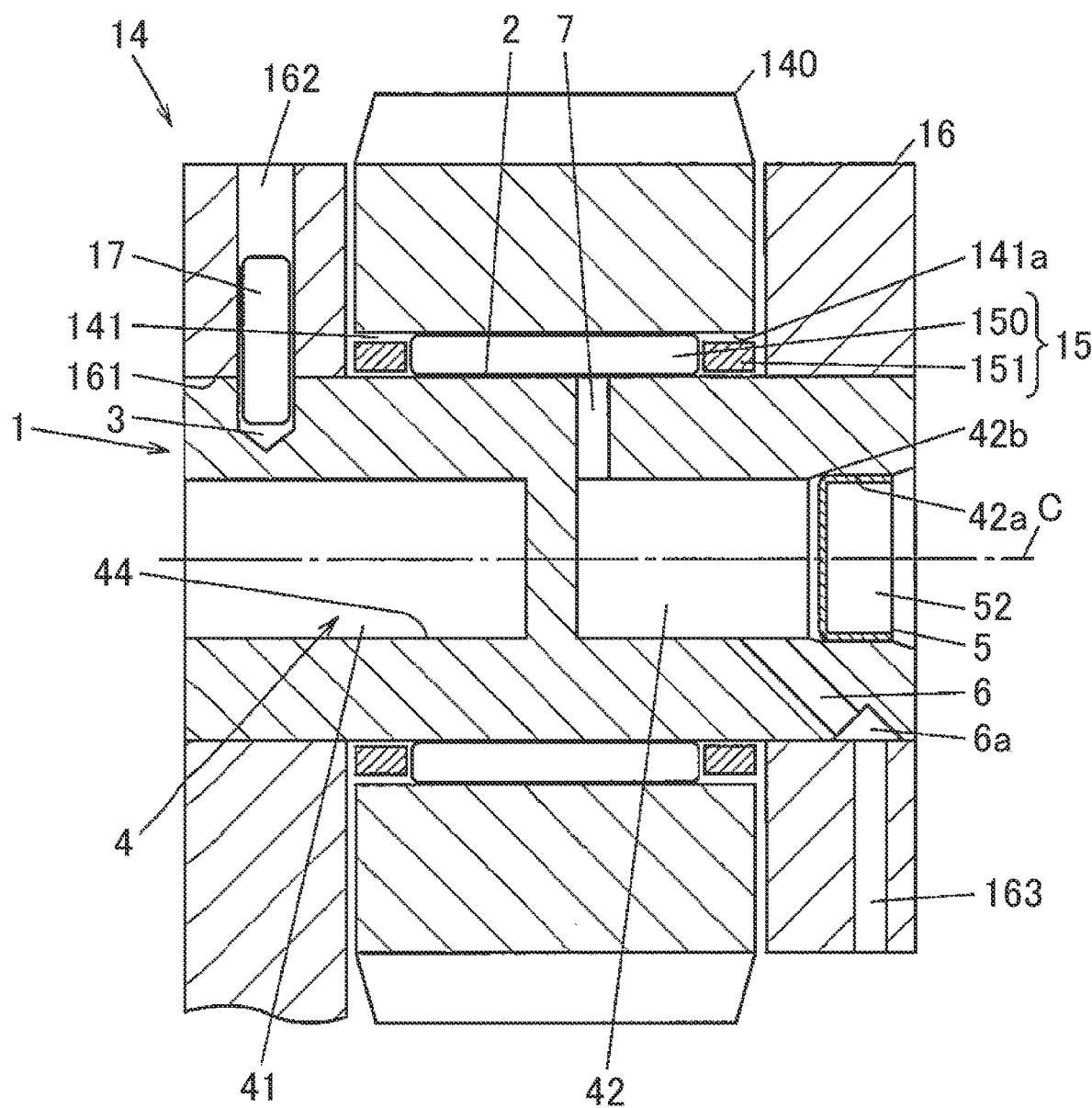
FIG. 5 is a sectional view of a planet gear using a rotator support shaft according to one modified example of the present invention.

In this embodiment, description is given of the case where the hollow portion 4 passes through the rotator support shaft 1 in the axial direction. The hollow portion 4 only needs to be open to both the axial end faces. As illustrated in FIG. 5, the hollow portion 4 need not essentially pass through the rotator support shaft 1 in the axial direction. In other words, the hollow portion 4 may be constituted by the first hollow portion 41 and the second hollow portion 42 without the communicating portion 43. In the example of FIG. 5, the oil inlet passage 6 and the oil outlet passage 7 communicate with the second hollow portion 42. The second hollow portion 42 is a part of the lubricating oil supply passage. Therefore, it is only necessary that the opening of the second hollow portion 42 that is a part of the lubricating oil supply passage be sealed with the second plug 52. Thus, the first plug 51 can be omitted. In this case, an inner peripheral surface 44 of the first hollow portion 41 where the first plug 51 is omitted may be a cylindrical surface having a uniform bore diameter.

As described above, the rotator support shaft 1 according to this embodiment has the hollow portion 4 formed so as to be recessed in the axial direction from both the axial end faces. At least one of the openings of the hollow portion 4 at both the end faces is sealed with the plug 5. The rotator support shaft 1 has the oil inlet passage 6 and the oil outlet passage 7. The lubricating oil is supplied through the oil inlet passage 6 into the hollow portion 4 sealed with the plug 5. The oil outlet passage 7 passes through the rotator support shaft 1 from the raceway surface 2 to the sealed hollow portion 4. The lubricating oil in the hollow portion 4 is supplied to the raceway surface 2 through the oil outlet passage 7.

Thus, the hollow portion 4 to be used for weight reduction and as a part of the lubricating oil supply passage can be formed by performing backward extrusion for both the axial ends. As a result, a plastic deformation amount per processing operation can be reduced as compared to a case where the backward extrusion is performed for one axial end alone. Accordingly, the rotator support shaft 1 can easily be manufactured by forging at low costs. That is, according to this embodiment, the annealing step for removing work hardening is unnecessary unlike the related art even if a deep hollow portion 4 having a small diameter is formed. Thus, the time and effort for manufacture and the manufacturing costs can be reduced greatly.

Since the plastic deformation amount per processing operation is reduced, loads on the forging dies (lower die 100 and punch 102) are reduced. Thus, the life of each forging die can be prolonged. Further, a thinner and deeper hollow portion 4 can be formed as compared to the case where the backward extrusion is performed for one axial end alone as in the related art. Thus, the dimensional range of the applicable hollow portion 4 can be widened.

Although the present invention has been described above based on the embodiments, the invention of the claims is not limited to the embodiments. It should be noted that all combinations of the features described in the embodiments are not essential for the solution of the invention to the issue.

The present invention may be modified as appropriate without departing from the spirit of the present invention. For example, in the embodiment described above, the rotator support shaft 1 for use in the planetary gearing mechanism 11 is described. The use of the rotator support shaft 1 is not limited to this case. The rotator support shaft 1 may be used for supporting various rotators such as a roller and a connecting rod via the rollers 150.

In the embodiment described above, the case where the rotator support shaft 1 is manufactured by cold forging is described. The present invention is not limited to this case, and is also applicable to warm or hot forging.

In the embodiment described above, a columnar outer ring (race) may be used between the planet gear 140 and the rollers 150. In this case, the rotator support shaft 1, the rollers 150, the cage 151, and the outer ring, as a set, constitute the roller bearing. In this roller bearing, a structure similar to that of the planet gear unit 14 of the embodiment described above can be attained by, for example, arranging the planet gear 140 that is the rotator on an outer peripheral side of the outer ring. In this roller bearing, the member arranged on the outer peripheral side of the outer ring need not essentially be the rotator. The outer ring may be arranged in a retaining hole of a non-rotational member such as a case, and a rotator may be fixed to the rotator support shaft 1.

According to the present invention, it is possible to provide the rotator support shaft that can easily be manufactured by forging, the method for manufacturing the rotator support shaft, and the roller bearing.

What is claimed is:

1. A columnar rotator support shaft configured to support a rotator and having a raceway surface formed on an outer peripheral surface of the rotator support shaft so that a plurality of rollers roll on the raceway surface, the rotator support shaft comprising:
    a hollow portion formed so as to be recessed in an axial direction from both axial end faces;
    a sealing member that seals at least one opening of the hollow portion at one of the axial end faces;
    an oil inlet passage through which lubricating oil is supplied into the hollow portion sealed with the sealing member; and
    an oil outlet passage through which the lubricating oil in the hollow portion is supplied to the raceway surface, the oil outlet passage passing through the rotator support shaft from the raceway surface to the hollow portion, wherein
    the sealing member has a bottom wall and a tubular portion that are integral,
    the hollow portion has a large-diameter portion at an opening-side of the hollow portion, an interior portion interior to the large-diameter portion, and a step between the large-diameter portion and the interior portion, and
    the sealing member is inserted into the large-diameter portion so that the bottom wall faces the step.

2. The rotator support shaft according to claim 1, wherein the hollow portion includes:
    a first hollow portion open to one side in the axial direction;
    a second hollow portion open to the other side in the axial direction; and
    a communicating portion that communicates the first hollow portion with the second hollow portion, and the rotator support shaft includes:
a first plug serving as the sealing member to seal an opening of the first hollow portion; and
a second plug serving as the sealing member to seal an opening of the second hollow portion.

3. A method for manufacturing a columnar rotator support shaft configured to support a rotator and having a raceway surface formed on an outer peripheral surface of the rotator support shaft so that a plurality of rollers roll on the raceway surface, the method comprising:
forming a hollow portion so that the hollow portion is recessed in an axial direction from both axial end faces by performing backward extrusion for both axial ends;
sealing, with a sealing member, at least one opening of the hollow portion at one of the axial end faces; and
forming an oil inlet passage through which lubricating oil is supplied into the hollow portion sealed with the sealing member, and an oil outlet passage through which the lubricating oil in the hollow portion is supplied to the raceway surface, the oil outlet passage passing through the rotator support shaft from the raceway surface to the hollow portion, wherein
the sealing member has a bottom wall and a tubular portion that are integral,
the hollow portion has a large-diameter portion at an opening-side of the hollow portion, an interior portion interior to the large-diameter portion, and a step between the large-diameter portion and the interior portion, and
the sealing member is inserted into the large-diameter portion so that the bottom wall faces the step.

4. A roller bearing, comprising:
a columnar rotator support shaft;
a plurality of rollers to be interposed between the rotator support shaft and a rotator; and
a cage that retains the plurality of rollers, wherein
the rotator support shaft is configured to support the rotator via the plurality of rollers, and has a raceway surface formed on an outer peripheral surface of the rotator support shaft so that the plurality of rollers roll on the raceway surface, and
the rotator support shaft includes:
a hollow portion formed so as to be recessed in an axial direction from both axial end faces;
a sealing member that seals at least one opening of the hollow portion at one of the axial end faces;
an oil inlet passage through which lubricating oil is supplied into the hollow portion sealed with the sealing member; and
an oil outlet passage through which the lubricating oil in the hollow portion is supplied to the raceway surface, the oil outlet passage passing through the rotator support shaft from the raceway surface to the hollow portion, wherein
the sealing member has a bottom wall and a tubular portion that are integral,
the hollow portion has a large-diameter portion at an opening-side of the hollow portion, an interior portion interior to the large-diameter portion, and a step between the large-diameter portion and the interior portion, and
the sealing member is inserted into the large-diameter portion so that the bottom wall faces the step.

* * * * *